United States Patent [19]

Peckworth

[11] Patent Number: 4,593,263

[45] Date of Patent: Jun. 3, 1986

[54] MILEAGE RECORDING AND SERVICE REMINDING ACCESSORY FOR A SHARED-USE VEHICLE

[76] Inventor: Ralph H. Peckworth, 1241 Rollins Ave., Charlotte, N.C. 28205

[21] Appl. No.: 518,812

[22] Filed: Jul. 29, 1983

[51] Int. Cl.⁴ .......................... G01D 9/00; B60Q 1/00
[52] U.S. Cl. ..................................... 340/52 D; 235/97
[58] Field of Search ............... 340/52 D, 688; 40/514, 40/515; 235/97; 377/82, 87; 70/258, 339, 434

[56] References Cited

U.S. PATENT DOCUMENTS

| | | | |
|---|---|---|---|
| 2,258,525 | 10/1941 | Vigurs | 40/514 |
| 2,435,907 | 2/1948 | Schirokauer | 340/52 D |
| 3,179,336 | 4/1965 | Peckworth | 235/97 |
| 3,856,195 | 12/1974 | Kakizaki et al. | 235/97 |
| 3,911,855 | 10/1975 | Haven | 340/52 D |
| 3,925,754 | 12/1975 | Ota et al. | 340/52 D |
| 4,159,531 | 6/1979 | McGrath | 340/52 D X |
| 4,547,781 | 10/1985 | Gelhorn et al. | 235/97 X |

Primary Examiner—James L. Rowland
Assistant Examiner—Brian R. Tumm
Attorney, Agent, or Firm—Clifton Ted Hunt

[57] ABSTRACT

A mileage recording and service reminding accessory for a shared-use vehicle is provided as a self-contained unit which may be installed as original equipment at the time of manufacture or added as a modification accessory to an existing vehicle. The console includes auxiliary individual odometers or hour meters for different persons authorized to use the vehicle, a master meter within the console, an electric circuit operable to selectively connect a desired auxiliary odometer or hour meter to the master meter, and a service warning meter for registering and displaying pre-selected target mileages for prescribed service. The console also includes a key actuated switch for each of said individual odometers or hour meters. Actuation of each switch activates the ignition and contemporaneously activates only its respective odometer or hour meter to record the vehicle usage for the then current user independently of the usage recorded for the other users.

4 Claims, 12 Drawing Figures

```
CODE F  MILES 30,000
SHOP       DATE
MGR
MECHANIC
```

| |
|---|
| Change engine oil (3,4) |
| Replace engine oil filter (3,4) |
| Replace spark plugs (1) (4) |
| Check coolant condition and protection (5) |
| Replace coolant (6) |
| Checking cooling system, hoses, and clamps (7) |
| Check drive belt condition and tension |
| Replace PCV Valve if part number is specified on engine decal. All others not required (2) (8) |
| Check idle fuel mixture after PCV Valve replacement if artificial enrichment specifications are given on engine decal-all others not required. (1) (2) |

FIG. 12

MILEAGE RECORDING AND SERVICE REMINDING ACCESSORY FOR A SHARED-USE VEHICLE

BACKGROUND OF THE INVENTION

The use of multi-odometers in a single vehicle to be shared by more than one family is disclosed in my prior U.S. Pat. No. 3,179,336 issued Apr. 20, 1965 and entitled MULTI-ODOMETER FOR VEHICLES. That patent discloses an automatic allocation system dependent on the generation of electrical impulses to allocate mileage to only the current driver of the vehicle but the system disclosed in my earlier patent for controlling the electrical impulses proved impractical to install on a vehicle.

SUMMARY OF THE INVENTION

Unlike my prior patent, all of the mechanism of the present invention is assembled within a single housing which may be installed as an accessory to a shared-use vehicle subsequent to the manufacture of the vehicle.

A separate odometer is provided for each participant in a shared-use vehicle, all of the odometers being housed in the console of the accessory package. The mileage for each successive driver is recorded not only on the odometer with which the car is conventionally equipped at the time of manufacture but also on the specific odometer reserved for the driver who is using the vehicle at the time the mileage is being recorded. Means are provided for recording the mileage on the driver's specific odometer by electrical impulses independently of the conventional cable driven odometer installed in the car at the time of manufacture.

Means are also provided in the accessory console for recording the collective mileage of all users on a pair of mechanical odometers, one equipped to visually show total miles, thus serving as a verification unit, and the other, herein referred to as the master odometer, equipped to actuate and control electrical impulses, both to the personal electric odometers previously mentioned, and to a service warning read-out wheel to display a warning when conventional predetermined maintenance is required on the vehicle, as specified by the auto manufacturer, either every 7,500, 10,000 or 15,000 miles.

It is an object of the invention to provide an accessory for a shared-use vehicle of the type described wherein all elements of the invention are contained within a single console and wherein the console is equipped with ports for connection to the transmission and to the electrical system of the vehicle.

It is another object of the invention to provide a mileage allocation recording system and service reminding system for a shared-use vehicle of the type described and wherein the system includes means for generating and controlling electrical impulses to record the mileage within the accessory console to only the current driver of the vehicle.

It is a further object of the invention to provide a service reminder for a vehicle comprising means for recording the mileage of the vehicle and making it responsive to the generation of electrical impulses and means for posting the next target mileage when service is due in black figures, and subsequently showing the target mileage in red when the service is actually due.

It is a further object of the invention to provide means for dispensing a pre-printed listing of the service items called for by the manufacturer's service manual at each pre-determined mileage interval.

Some of the objects of the invention having been stated, other objects will appear to those skilled in the art from the following description when considered in connection with the accompanying drawings wherein:

DETAILED DESCRIPTION OF THE INVENTION

Referring more specifically to the drawings, the numeral 10 broadly indicates a shared-use console adapted to be mounted beneath the dashboard 11 of a vehicle, not shown. The vehicle may be an automobile, a tractor, an airplane, or a boat, for example. It is conventional for an automobile to use an odometer 20 (FIG. 5) to record the mileage traveled by the automobile, and it is conventional to use an hour meter $20^1$ (FIG. 4) to record the hours of operation of other vehicles, such as airplanes and boats. The invention is equally useful with an odometer or with an hour meter, and the illustrated embodiment is described as being used with an odometer for purposes of illustration.

The console 10 includes a front wall 12, side walls 13, 14, a top wall 15 and a bottom wall 16. The front wall 12 includes a plurality of read-out windows through which the displayed numbers of the shared-user's specific odometer and the service reminder odometer can be read. Read-out windows A, B, C and D display, for example, respective odometers 20A, 20B, 20C and 20D of personnel sharing the use of the vehicle and hereafter referred to in an explanatory manner as Abbott, Brown, Collins and Dolan. The console 10 also includes locks 21A, 21B, 21C, and 21D co-operatively associated with respective odometers 20A, 20B, 20C and 20D and accessible through the front wall 12 of the console. The locks are responsive to actuation by respective differing keys owned by the users of the vehicle, Abbott, Brown, Collins and Dolan to actuate their respective odometers only when any one of them is using the vehicle. A second key or keys, available to all of the users, fits the standard or conventional ignition 22 of the vehicle, located in a conventional manner either on the dashboard or the steering post.

Figure 6:
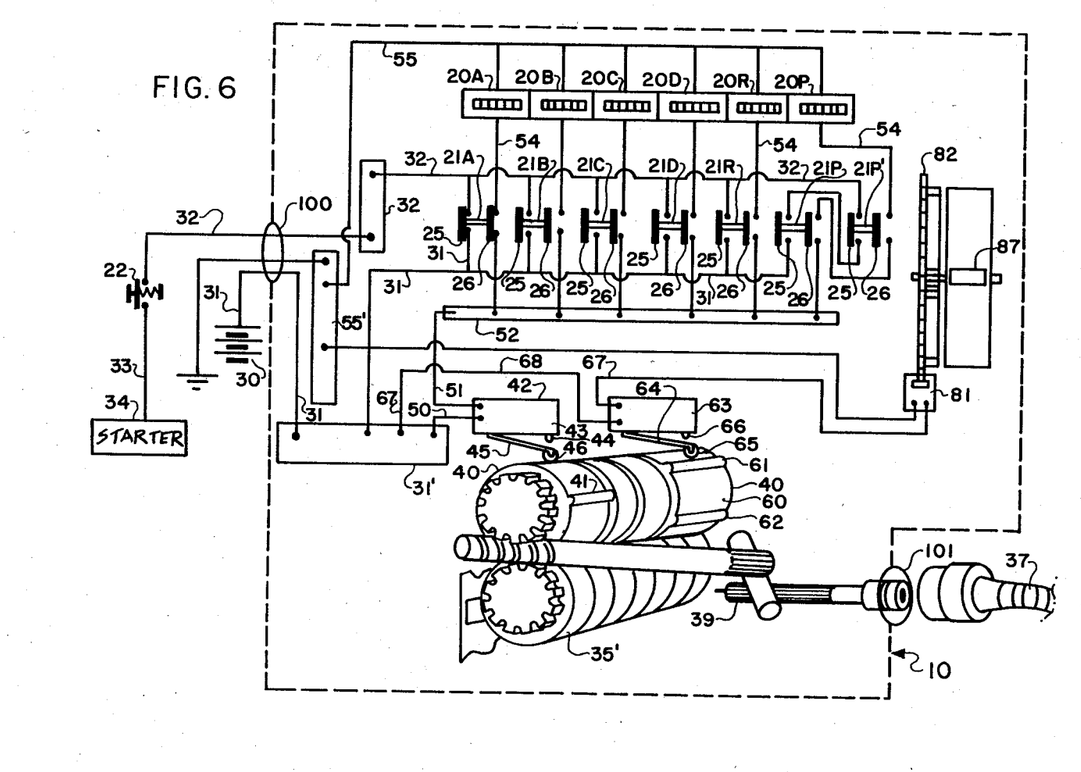
FIG. 6 is a schematic view of the electrical wiring diagram connecting the individuals' specific odometers within the shared-use console (shown in dashed lines) to the electrical system of a vehicle and to the electric pulse generators operatively connected to the master meter.

Normally, the starter mechanism for a vehicle is actuated by unlocking the ignition which momentarily closes a starter switch wired in series with the starter mechanism and a battery providing the source of electric energy. In the present instance, the wiring diagram of FIG. 6 schematically shows the ignition switch 22 as a push-button switch for purposes of simplicity, wherein it is assumed that the ignition switch has been closed and the push-button switch 22 represents the starter switch of the vehicle with the ignition switch already closed. It should be understood that the switch 22 shown in the wiring diagram of FIG. 6 is for illustrative purposes only, as the conventional type of combined ignition-starter switch now found on most vehicles is intended to be schematically represented by the switch 22 in FIG. 6. As is well known, the conventional ignition-starter switch is provided with a rotatable cylinder which may be manually turned with or without the use of a key to unlock the ignition, permitting subsequent continued manual turning of the rotatable cylinder in the same direction to close the starter switch for actuating the starter mechanism to begin the operation of the internal combustion engine. When manually released, the rotatable cylinder of the ignition-starter switch 22 turns in the opposite or counter-clockwise direction to the "on" position of the ignition switch while opening the starter switch in the well-known manner.

Figures 4, 9:
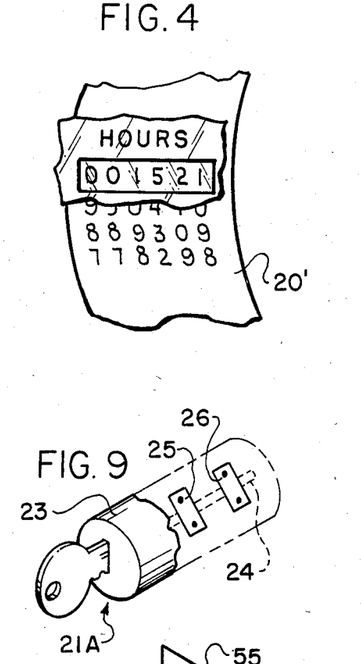
FIG. 4 is a fragmentary perspective view of a read-out wheel containing indicia reflecting the hours a vehicle such as an airplane or boat has operated.
FIG. 9 is an enlarged fragmentary perspective view, partially broken away for purposes of clarity, of one of the key-operated lock switches associated with an individual's specific odometer within the console, as illustrated in the wiring diagram of FIG. 6.

According to the present invention, the closing of the starter switch of the combined ignition-starter switch 22 in the manner described will not actuate the starter mechanism to start the internal combustion engine or maintain the ignition actuation unless one of the independently operable shared-use locks 21A, 21B, 21C or 21D has been rendered operable by inserting the specific key for that lock and turning its rotatable cylinder 23 (FIG. 9). The rotatable cylinder 23 contains an elongate spindle 24 movable therewith and on which are carried a pair of spaced switch plates 25, 26 having switch contacts at their opposite ends. Thus, activation of a shared-use lock, such as 21A, enables operation of the ignition system and at the same time activates the corresponding odometer 20A, for example, to register the mileage of the key-holding current driver, Abbott. It should be noted that the personal keys carried by Abbott, Brown, Collins and Dolan are removable in both the "on" or "off" positions and that it is necessary for each individual operator to use his personal key only to activate the ignition circuit and his personal meter when taking over the vehicle and again to deactivate his personal circuit and meter when surrendering the vehicle to another user. These are the only occasions when use of his personal key is required. All other stops and starts only require use of the conventional ignition key in the normal manner.

ELECTRICAL STARTER CIRCUIT

Referring to FIG. 6, the electrical starter circuit can be traced from a battery 30 through an electrical conductor or wire 31, through wiring port 100 and Battery Bus Bar $31^1$, thence through a selected one of the lock switches 21A, 21B, 21C or 21D which has been closed to make connection with another electrical conductor or wire 32 leading through an Ignition Bus Bar $32^1$ and the wiring port 100 to one terminal of the conventional ignition-starter switch 22, and across the switch 22 when closed to the other terminal thereof. Another conventional electrical conductor or wire 33 extends from said other terminal of the switch 22 to the starter mechanism 34.

The lock switches 21A, 21B, 21C and 21D are wired in parallel across the electrical conductors 31 and 32. Thus, the electrical starter circuit can only be completed by closing the conventional ignition switch 22 after any selected one of the lock switches 21A, 21B, 21C or 21D has been closed to position plate 25 across spaced apart terminals linking the electrical conductors 31 and 32. Closing one of the above lock switches 21A, 21B, 21C or 21D also positions plate 26 across spaced apart terminals linking the per mile impulses from switch 42 to one of the properly allocated personal mileage recorders, 20A, 20B, 20C or 20D by closing the terminals connecting bus bar 52 to connector wire 54.

OTHER PURPOSES OF A SHARED-USE VEHICLE

The console 10 may also include odometers and lock switches to be activated by appropriate keys for other purposes of the shared-use vehicle. Thus, lock switch 21R and its corresponding odometer 20R may be activated by an appropriate specific key when manipulated by one who has rented the vehicle from the owners. Provision may also be made for the shared-use vehicle to be operated as a pool vehicle. In this instance, it is contemplated that it will take two specific keys to operate two specific lock switches 21P and $21P^1$ to activate the starter mechanism in addition to the conventional ignition switch so that there can be verification that the pool car was used as intended, and the pool mileage registered on odometer 20P. Thus, a rural residing factory worker with a high mileage commute, who would normally not be accepted by a small town group commuting to the city, can join such an out of balanced "car pool" since his excess rural mileage can be recorded separately from the car pool mileage without recourse to any bothersome record keeping.

Another feature of this invention that will encourage the use of car pools, is the fact that a group such as Abbott, Brown, Collins and Dolan can use the vehicle on week days for commuting to work, and take turns using the same vehicle for recreational purposes on weekends, evenings, or other "non-work" time periods.

ILLUSTRATIVE USE OF THE SHARED-USE SYSTEM

Figure 1:
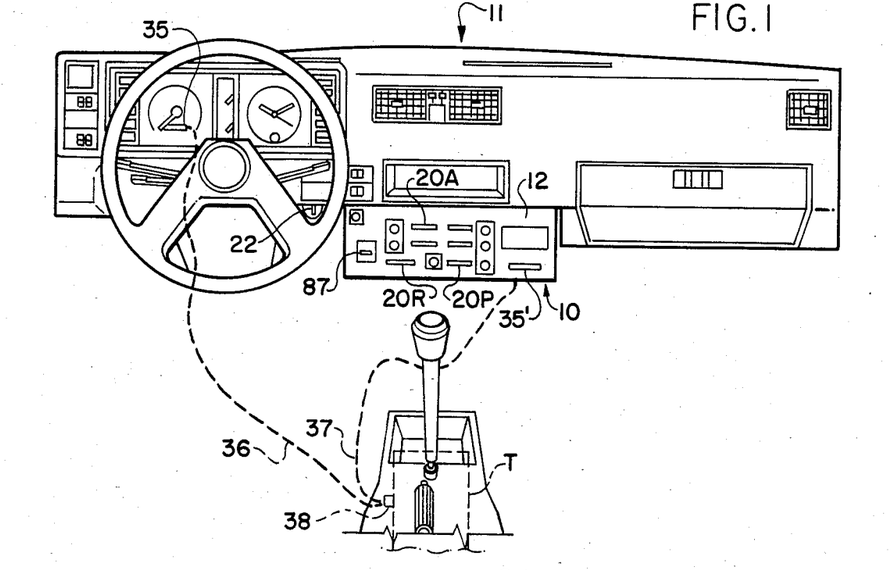
FIG. 1 is a front view of the dash board of a shared-use vehicle equipped with the mileage recording and service reminding accessory console.
Figures 5, 8:
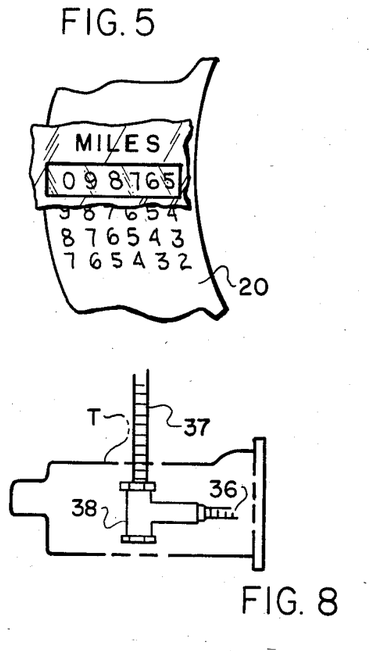
FIG. 5 is a view similar to FIG. 4 but showing the miles a vehicle such as an automobile has traveled.
FIG. 8 is a fragmentary perspective view of a vehicular transmission illustrating attachment of the odometer cable.

Assuming that a participant in the shared-use vehicle, Abbott, desires to use the vehicle and has started the engine by placing his specific key in lock switch 21A and has placed the general use ignition key in ignition switch 22 and thereby started the engine, the mileage traveled by the shared-use vehicle will then be recorded on the odometer 35 (FIG. 1) conventionally installed adjacent the speedometer on the dashboard of the vehicle. The mileage is recorded on the conventional odometer 35 by a conventional speedometer cable 36 extending from the transmission T of the vehicle (FIG. 8).

Figure 2:
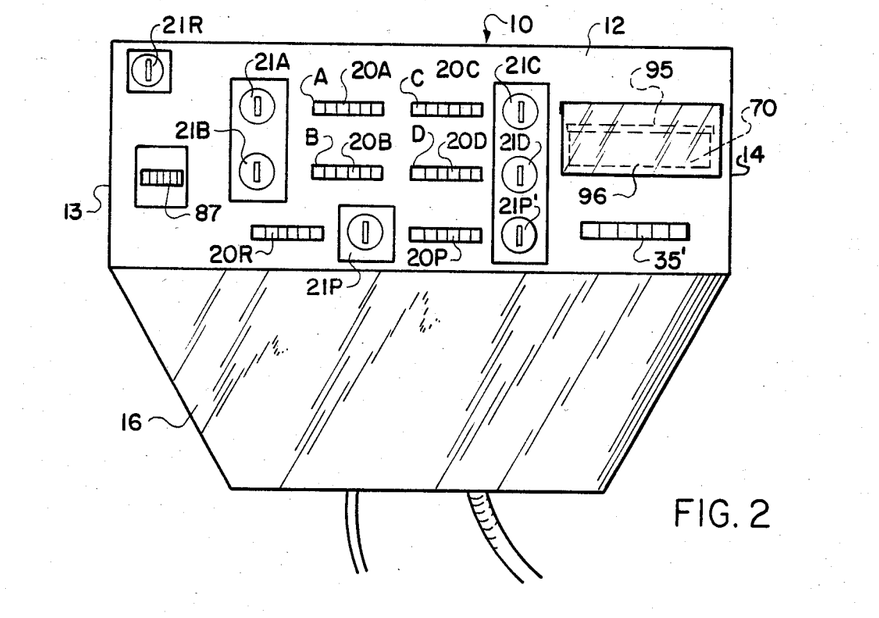
FIG. 2 is a perspective view of the mileage recording and service reminding console removed from the vehicle.

Additionally, the mileage traveled by the vehicle while being operated by Abbott will be recorded on his assigned odometer 20A and on a verification odometer 35[1] (FIGS. 1 and 2) through a separate cable 37 (FIG. 8) extending from the transmission T through a dual cable adapter 38. The transmission cable 37 extends to the cable port 101 in the console 10 (FIGS. 3 and 6) where it is secured by a conventional speedometer type cable head to gearing 39 and hence the verification odometer 35[1] and also to master odometer 40.

TYPES OF ODOMETERS

The conventional odometer 35, the master odometer 40 and a verification odometer 35[1] are all mechanically driven and the first right hand wheel of each is a unit wheel arranged to register "tenths" of a mile. These odometers operate constantly whenever the vehicle is in operation.

The individual odometers 20A, 20B, 20C, 20D, 20P, 20R are selectively operated electric odometers having the counter wheels and the actuating solenoid mechanism enclosed together in a conventional manner in a unit housing. The first right hand wheel of each is a "units" wheel registering one mile for each number segment or 10 miles per revolution. Both the mechanical and the electric odometers comprise a plurality of counter wheels journaled on a common shaft and mounted for segmental rotation in a conventional manner common to counters or odometers.

Verification odometer 35[1] is readable through a readout window and may be used as verification of the total miles by comparison with the conventional odometer 35 on the vehicle's instrument panel, thereby confirming that the console has been connected at all times. Each wheel is numbered from zero to nine around its circumference and, as is conventional, the right hand wheel rotates to present a new numeral at the viewing window for every tenth of a mile of operation. A complete revolution of the right hand wheel imparts movement of one-tenth of a revolution to the next wheel as is conventional.

THE MILEAGE ALLOCATION SYSTEM

The master odometer 40 differs from the conventional odometer and the other odometers in the console of this invention by including means to convert certain digit wheels into rotary switches to sense a complete revolution of the wheel. In the illustrated embodiment, a shoulder or abutment 41 extends axially along the surface of the right hand wheel at the portion of the circumference coinciding with the location of the numeral zero.

The shoulder 41 on the right hand wheel extends into the path of an electrical switch broadly indicated at 42 and comprising a housing 43 (see FIG. 6) containing terminals, not shown, which are closed to complete a circuit upon depression of a button 44 caused by inward movement of a pivoted arm 45 resulting from impingement of a follower wheel 46 with shoulder 41. The follower wheel 46 rests on the circumference of the counter wheel of odometer 40 in spaced relation from the housing 43 but is moved inwardly toward the housing to depress the button 44 upon engagement with the shoulder 41, once per mile or each time the counter wheel 40 makes a complete revolution.

Figure 7:
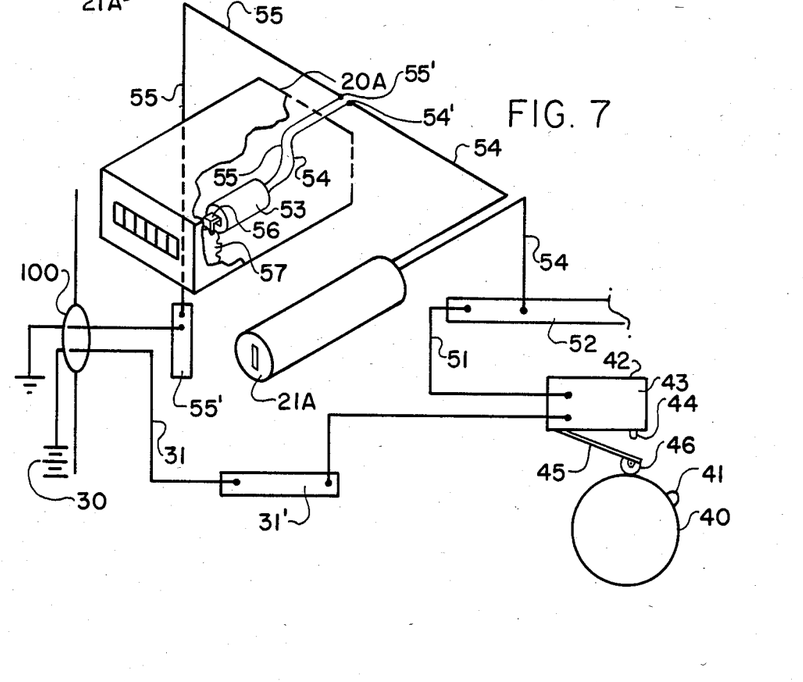
FIG. 7 is a somewhat schematic view, partially in perspective and with parts broken away, of a shared user's electric odometer, his personal ignition switch, the pulse generating unit, and the relevant circuitry.

A pair of electric conductors or wires 50 and 51 extend from the switch 42, the wire 50 being connected to a battery bus bar within the console and thence through the wiring port to battery 30, and the wire 51 being connected to a bus bar 52 within the console 10; and hence to terminals at switch plate 26 of lock switch 21A. With Abbot's key inserted in lock switch 21A and the cylinder in that lock rotated to energize the ignition switch 22 to start the vehicle, the closing of the terminals 25 and 26 in lock switch 21A simultaneously establishes a circuit between the switch 42 and the odometer 20A to record Abbott's mileage. Each of the odometers 20A through 20P within the console 10 is a conventional electric odometer having the odometer unit and the actuating mechanism housed together in a unit casing in a conventional manner, with external terminals 54[1], 55[1] (FIG. 7) which renders the odometer responsive to electrical impulses from switch 42 after each revolution of the right hand (or demical wheel) of master odometer 40. Wires 54 extend from the electric odometers to the terminals of switch plate 26 inside key switch 21A (FIG. 9) which, when closed, connects to bus bar 52 and wire 51 to connect the electric odometer 20A to the electric pulse switch 42. Wire 55 from each electric odometer connects, via ground bus bar 55[1], through wire port 100, to an outside ground. Each time a pulse is generated by engagement of the abutment 41 with the follower 46, an arm 56 projects from the solenoid 53 to engage a ratchet wheel 57 and impart an increment of rotation to the right hand wheel. The ratchet wheel 57 is journaled with the counter wheels on the odometer 20A so that rotation of the ratchet wheel causes corresponding rotation of the right hand units wheel. The decimal wheel of master odometer 40 makes a complete revolution once per mile and each time the abutment 41 moves the follower 46 against the button 44, a pulse is generated to activate the electric odometer and impart one tenth rotation or one numeral advance to the unit wheel and signify passage of one miles.

The example given for Abbott and his odometer 20A and lock 21A is equally applicable to the other locks and odometers within the console 10. The invention can be adapted for use with an hour meter 20[1] by substituting a conventional electric clock driven mechanism for the speedometer cable 37 and the gearing 39, and using it to drive a set of dual hour meters, one to serve for verification and the other as a master clock unit serving as rotary switches to generate impulses in the same manner as that described for the master odometer.

The standard ignition key supplied by the vehicle's manufacturer, and carried in a special keycase, with the trunk key, and a special credit card, stays with the vehicle at all times, being passed from one user to the other. This key is the only key necessary for all routine stops and starts, in the same manner as if the user were the sole owner.

THE SERVICE WARNING SYSTEM

The master odometer 40 has no read-out window since its main purpose is to control electrical impulses originating within the console, both to record allocated mileage, as previously described, and to give warning of the approach and the arrival of various pre-determined target mileages at which service work on the vehicle is recommended. This service warning system is described as follows with reference to FIG. 6:

The Service Warning System is included in the console 10 and responds to electrical impulses controlled, in the case illustrated by the left hand or "hundreds" wheel 60 of the master total miles odometer 40. The "hundreds" wheel has a shoulder or abutment 61 at the "zero" position, and a diametrically opposed shoulder or abutment 62 at the "5" position.

Figure 3:
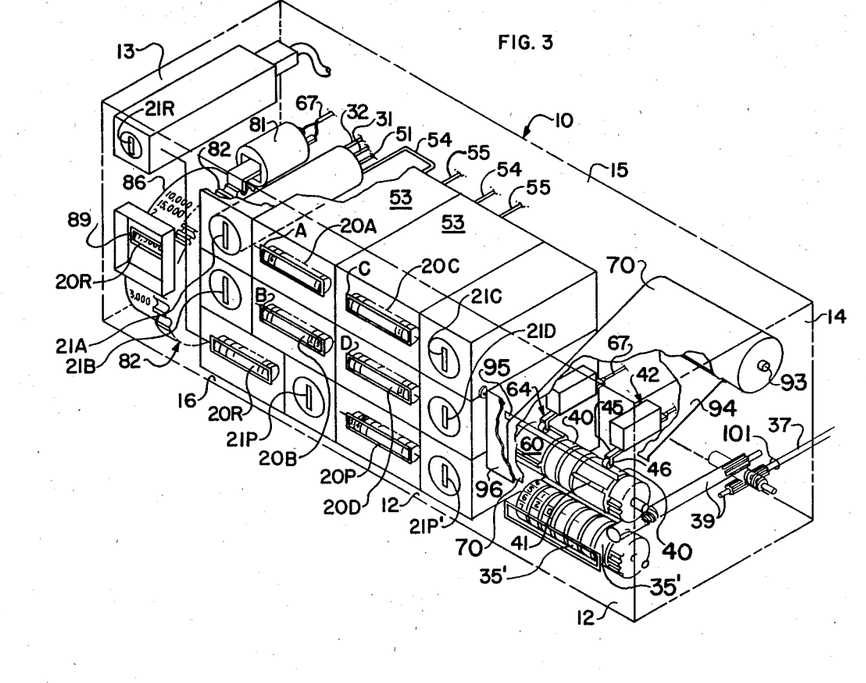
FIG. 3 is a perspective view illustrating the components of the mileage recording, service reminding, and service list dispensing features of the console and showing the housing in phantom lines.

A switch 63 is mounted within the console 10 adjacent the "hundreds" wheel 60 of the master odometer 40. The switch 63 is similar to the previously described switch 42 and includes a pivoted arm 64 equipped with a follower wheel 65 resting on the circumference of the hundreds wheel and engageable by the shoulders 61 and 62 as the hundreds wheel rotates. Engagement of the follower wheel 65 with one of the shoulders 61 or 62 closes contacts, not shown, within the switch 63 to generate a pulse every 500 miles which is sent through wire 67 to solenoid 81 (FIGS. 3 and 6). Wire 68 connects switch 63 to battery bus bar $31^1$. Thus rotation of wheel 60 actuates the switch 63 twice per revolution or every 500 miles. The unseen terminals of the switch are closed to complete a circuit upon depression of a button 66 caused by inward movement of the pivot arm 64 resulting from impingement of the follower wheel 65 with shoulders 61 and 62.

Each pulse generated by the switch 63 actuates the solenoid 81 to move a thirty-cog ratchet wheel 82 (FIGS. 6 and 10) one ratchet cog, or 12° every 500 miles, completing one revolution every 15,000 miles. Attached to the ratchet wheel 82 is a gear blank 83 of slightly lesser diameter having gear tooth segments 83A, 83B, 83C, and 83D at the quarter points which engage in a conventional manner the pinion gear 84 (FIGS. 10 and 11) that transfers rotation in 12° increments to a sixty-tooth gear 85 (FIG. 11) affixed to a large read-out wheel 86 inscribed on its circumference with the manufacturer's designated target mileages for pre-determined service. The inscribed target mileages are sequentially visible through service warning window 87 (FIGS. 3 and 11).

Figure 10:
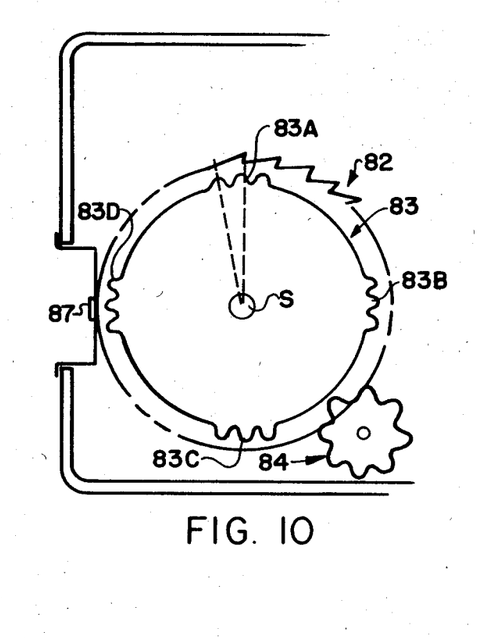
FIG. 10 is a somewhat schematic side elevation of the gearing associated with the service reminding meter.
Figure 11:
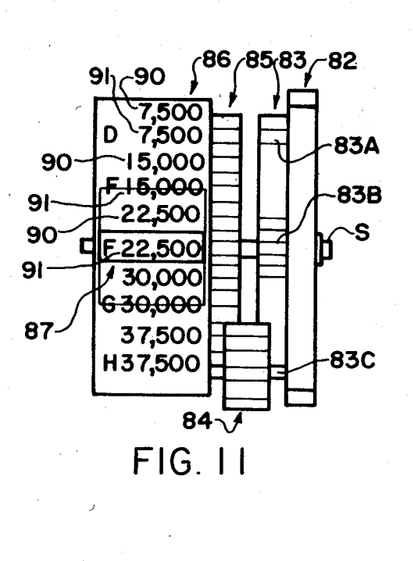
FIG. 11 is a front view of the service reminding meter and the gearing shown in FIG. 10.

The ratchet wheel 82 makes one revolution every 15,000 miles (30 cogs×500 miles) and its rotation is transferred four times per revolution of shaft S in FIGS. 10 and 11 by the four sets of gear segments, 83A, 83B, 83C and 83D located at quarter points of gear segment 83, thus advancing the service reminder read-out wheel 86 every 3,750 miles. The first showing of successive target mileage figures, beginning with the target mileage figure of 7,500, appear in black (as at 90 in FIG. 11) through the window 87 after the vehicle has traveled 3,750 miles and serves to warn all operators of the service scheduled to be performed after the vehicle has traveled 7,500 miles. The next showing of the same 7,500 mile target figure will appear in red as at 91 in FIG. 11 when the vehicle has traveled 7,500 miles and the scheduled service is due. In like manner, the succeeding target mileages are shown on the read-out wheel 86, first in black as at 90 to announce the next pending target mileage, and then in red as at 91 to indicate when the service is due. The nature of the service scheduled for each target mileage is represented by a code letter printed on the circumference of the read-out wheel 86 beside the red numerals and illustrated as D through H in FIG. 11.

SPECIFYING SERVICE REQUIREMENTS

Code letters D through H listed with the target mileage FIG. 91 displayed through window 87 coincide with a corresponding code letter on a plasticized pre-printed paper tape 70 (FIG. 3) wound on a shaft 93 suitably journaled within the console 10. The tape 70 is printed with the code letters and servicing to be performed at each targeted mileage. The tape 70 rolled up on shaft 93, unwinds over a slanting plate 94 which guides the tape to a dispensing slot 95 in the face of the console 10. A pivoted door 96 normally covers the slot 95, and the protruding tape 97 remaining after each "tear off" is confined and concealed by closing the door 96 on it so that prongs (not shown) on the under side of the door pierce and hold the tape against retraction. Suitable conventional braking devices (not shown) impinge on the shaft 93 and the length of tape 70 over the slanting plate 94 to avoid premature unwinding or loosening of the preprinted tape 70.

When the service work indicated by the displayed code letter is to be performed, the vehicle is delivered to the service department. The driver raises the pivoted door 96 and graps the end of the preprinted plasticized paper tape 70 protruding from the slot 95 and pulls the tape out until a tear-off point marked on the tape reaches the bottom of door 96. By closing the door (which has abrasive teeth on the under side) on the tape the driver can tear off the relevant portion of the tape bearing the listing of the work specified under the displayed code letter for the current target mileage.

Figure 12:
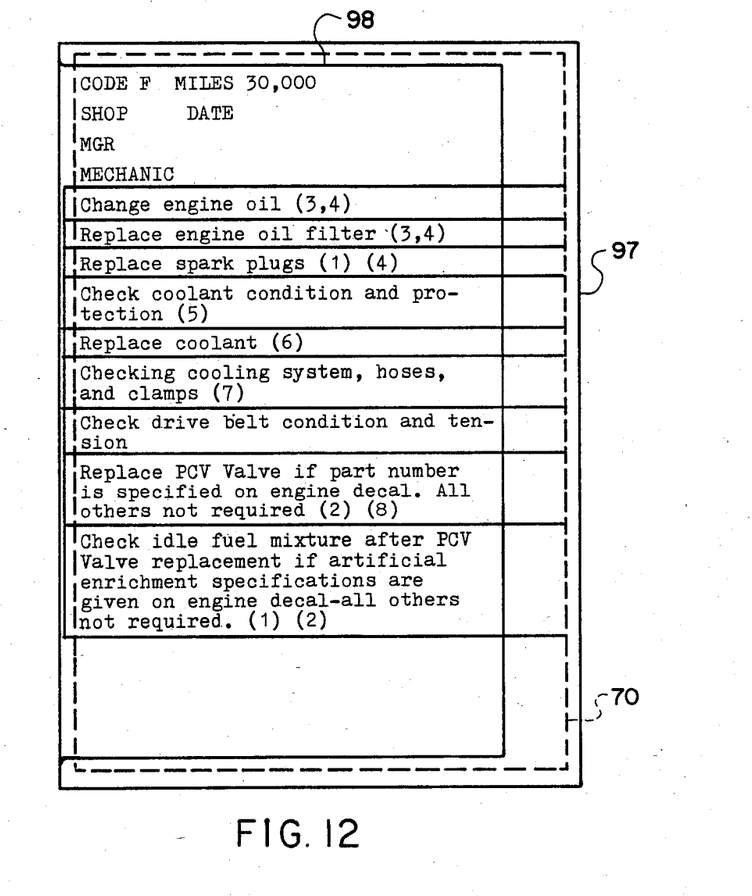
FIG. 12 is a plan view of a clip board which may be conveniently stored in the vehicle and used to permanently record the servicing performed on the vehicle in accordance with the service reminder meter.

The driver places the torn-off tape portion bearing the list of current service requirements on a small clip board 97 (FIG. 12) stored in retaining clips under the console 10 and leaves it with the attendant or mechanic. The clip board 97 has a clear plastic cover 98 under which the torn-off tape 70 is placed. The portion of the tape 70 protruding beyond the right edge of the plastic cover 98 permits the mechanic to check off the work items as performed without soiling the printed portion of the tape. Dated and signed, this list serves as a good record of the service work on the vehicle, enhancing its resale value, but more importantly insuring the sharing users that the vehicle is safely maintained.

This provision of the service reminder is particularly advantageous in a shared-use vehicle because it enables all users to know when service is desired in order to maintain the vehicle in good condition without having to keep independent notes or consult with the other users of the vehicle.

SUMMARY OF THE INVENTION

There is thus provided an improved mileage allocation recording system and a service reminding system which are self-contained in a console capable of being added as an accessory to a vehicle after it is decided to share use of the vehicle with other personnel thereby decreasing the operating expense to each user.

The expense of operation may be equitably apportioned among the users depending upon their actual use of the vehicle as determined by the mileage recorded on the individual's odometer within the console. All users are relieved of the responsibility of keeping records as to the necessary maintenance for the vehicle by the service reminder which dispenses written instructions when service is due on the vehicle.

By further facilitating the prospect of group leasing of a vehicle the normal monthly lease payment can be reduced to approximately one-fourth (¼) of the normal lease payment in the case of a four party agreement.

The invention will also facilitate the use of a common vehicle in different types of usage, for example, four workers can acquire a passenger van for use in a "go to work" van pool, arrange for rental of the van to their employer for delivery service between 10 A.M. and 4 P.M., and for their own personal recreational weekend use once a month.

Although specific terms have been employed in describing the invention, they are used in a descriptive sense only and are not intended as limitation, since the invention may also be used to minimize both the leasing and operating expense of boats, planes, tractors, and other vehicles.

I claim:

1. A shared-use vehicle having a master meter responsive to cumulative use of the vehicle and also having a group of auxiliary meters each of which is selectively operable to register only the use of the vehicle by a specific person, said shared-use vehicle including an additional electric odometer controlled by two switches in series with each other and with the said additional odometer, whereby the combined use of selected ones of the group of auxiliary odometers and of the additional car pool odometer enables the breakdown of commuting trips into private and car pool portions.

2. An accessory for a shared use vehicle having a meter responsive to cumulative use of the vehicle and also having a group of auxiliary meters, each auxiliary meter being selectively operable to register only the use of the vehicle by a specific user, the above meters being combined with an additional meter for car pool use, means requiring a plurality of users to activate the said additional meter for car pool use, and means for informing the then current user that the said target mileage has been reached and that the said scheduled maintenance is actually due.

3. A structure according to claim 2 which also includes means for warning all users of the pending target mileage when the next scheduled maintenance of the the vehicle will be due.

4. A structure according to claim 3 which also includes means for presenting to the then current user a printed list of the service work recommended for the scheduled maintenance that is then due.

* * * * *